United States Patent Office 3,443,227
Patented May 6, 1969

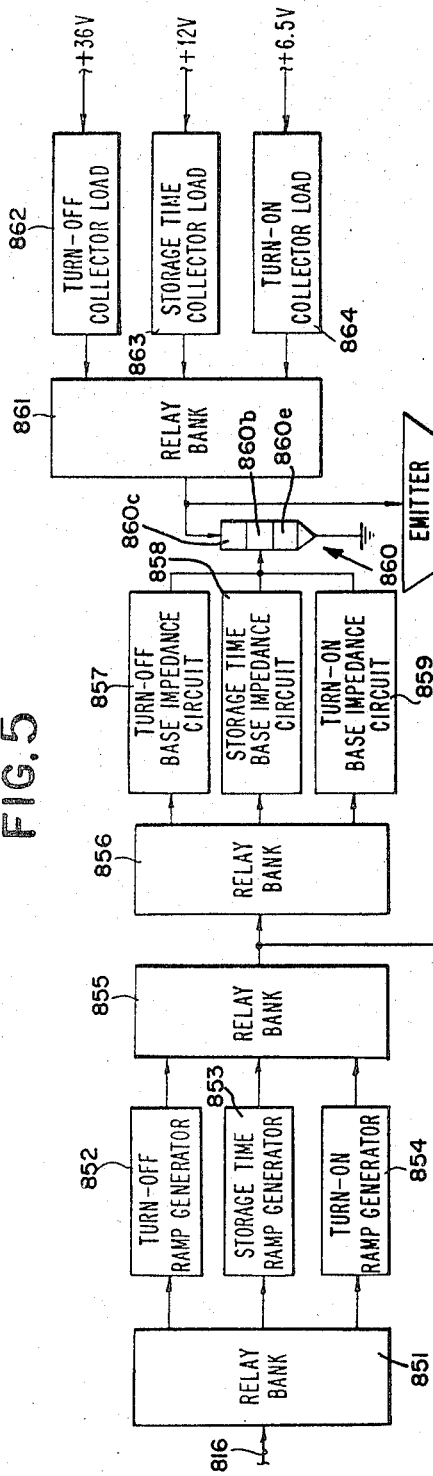
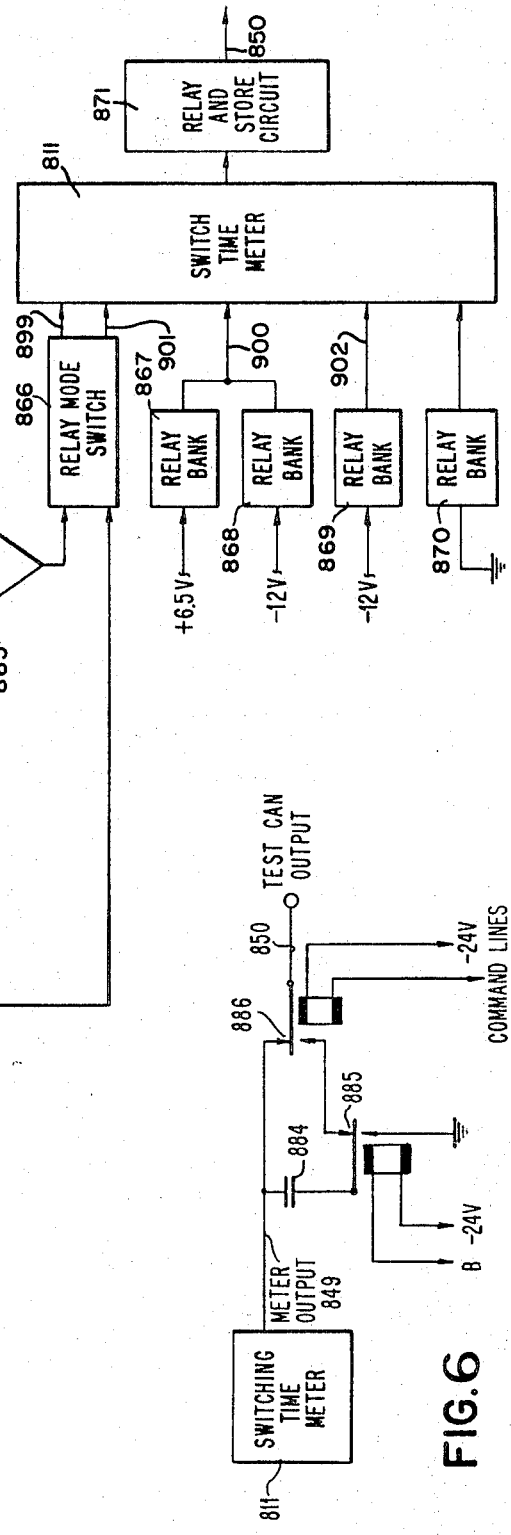
FIG. 5
FIG. 6

3,443,227
APPARATUS FOR INDICATING THE TRANSIENT
RESPONSE OF CIRCUIT ELEMENTS
Charles A. Kelly and Roland L. Pierson, Wappingers
Falls, N.Y., assignors to International Business Machines Corporation, Armonk, N.Y., a corporation of
New York
Filed June 29, 1965, Ser. No. 468,354
Int. Cl. G01r 27/28; H04b 3/46
U.S. Cl. 324—158          4 Claims

ABSTRACT OF THE DISCLOSURE

This patent discloses apparatus for determining the transition time (a particular case of which is rise or fall time) of active circuit elements. The apparatus includes a pulse generator and shaper for exciting a selected one of a plurality of ramp generators, the output from the selected ramp generator being connected to a selected one of a plurality of element input impedance circuits. In addition, a selected one of a plurality of load circuits, corresponding to the test to be performed on the element, is connected to the element under test. The input and output of the element under test is connected to latch means which is responsive to the input and output and which generates a first voltage which is proportional to a value to be determined, such as the turn-on time if the element is a transistor. The latch output is integrated and stored in a capacitor, the opposite terminal of which is connected through switch means to ground. A second voltage output from the integrator corresponding to a second pulse and input and output from the element is transmitted to the capacitor, the switch in the opposite terminal of the capacitor being connected to an output in order to transmit a voltage output which is proportional, in the illustrated instance, to the transition time of the circuit element.

---

This invention relates to means for testing the transient response of active circuit component, and more particularly to automatic apparatus for measuring the transition time of transistors.

The transition time may be defined as the time required for the potential of the collector of the transistor to change from one predetermined voltage level to another level in response to an input signal to the base of the transistor during the switching operation of the latter.

The subject apparatus performs this transition time measurement in a novel manner. More specifically, when it is desired to measure the transition time as the transistor is being switched "off," a turn-off input signal is applied to the transistor base at a predetermined time instant and the apparatus then measures the turn-off delay time. The latter is the time required after the input signal for the collector potential to rise initially to a first predetermined voltage level. The transistor is then turned "on" again and another turn-off input signal is applied to the base.

Now the subject apparatus measures the turn-off time required for the collector potential to rise to a second predetermined voltage level. In the case of the usual rise time measurement, the first voltage level is generally ten percent of the maximum collector voltage of the supply and the second voltage level is ninety percent of said supply voltage. Having thus obtained the turn-off delay time and then the turn-off time, the former is then subtracted from the latter to provide the transition time. In the case of the usual rise-time measurement, the transition time is thus the time for the collector potential to rise from ten percent of the supply voltage to ninety percent of the latter.

The transition time for the turn-on switching function is obtained in a similar manner. First the turn-on delay time is measured and then the transistor is switched off again and the turn-on time is then measured. The turn-on delay time is then subtracted from the turn-on time to provide the transition time.

These time measurements are performed by the subject apparatus in a novel manner. That is, a 20 kilocycle square wave signal is injected into the base of the transistor under test. The apparatus measures the time required for the potential of the collector to attain a predetermined voltage level and generates a 20 kilocycle square wave having a pulse width proportional to the time measurement. This width-modulated square wave is then integrated to provide a DC voltage proportional to the measured time.

Both of the required time measurements for the subtraction operation, that is, the turn-off delay time and turn-off time, or the turn-on delay time and the turn-on time, are thus converted into voltages. One voltage is then subtracted from the other voltage to provide a difference voltage which is proportional to the transition time being determined.

The subject apparatus also provides a novel means for subtracting the two time-successive DC voltages. The first voltage is applied to one terminal of a capacitor while its other terminal is grounded. The latter terminal is then disconnected from ground to leave the capacitor charged to a voltage equal to the first voltage. The second voltage is then applied to said one terminal, whereby the difference between the two voltages will appear at said other terminal of the capacitor.

The foregoing and other objects, features and advantages of the invention will be apparent from the following more particular description of preferred embodiments of the invention, as illustrated in the accompanying drawings, wherein:

FIG. 2 shows the base and collector voltage waveforms for a transition measurement during turn-on;

FIG. 5 shows schematically the circuitry within and associated with each AC test can;

FIG. 6 shows the means for subtracting the successive voltages to obtain a transition time measurement;

The subject invention is described below as embodied in a chip tester apparatus of the type disclosed in copending application Ser. No. 468,395, now Patent No. 3,400,933, entitled "Electrical Component Tester with Test Multiplexing" filed June 29, 1965 concurrently herewith and assigned to the same assignee. Reference is made to said copending application for details of the several elements of the chip tester apparatus such as the program plugboard and drive lines referred to briefly hereinbelow.

Figure 1:
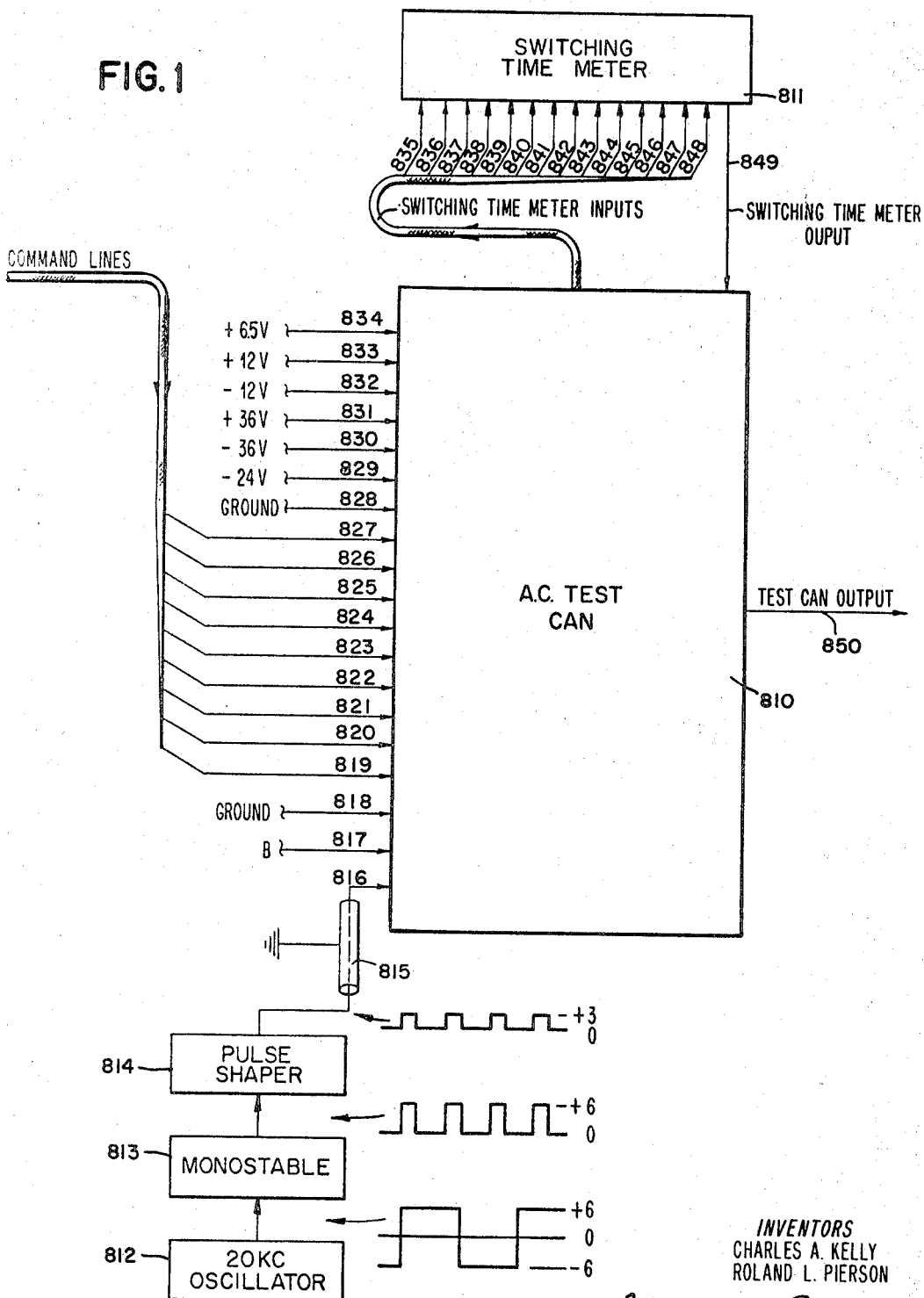
FIG. 1 shows an AC test can and circuitry associated therewith.

Referring first to FIG. 1, there are shown an AC test can 810, a switching time meter 811, and the inputs 835–848 and output 849 thereof. The can requires +6.5 volts, +12 volts, −12 volts, +36 volts, −36 volts, and −24 volts as power inputs from the system. These inputs are represented in FIG. 1 by functional lines 828 to 834. Nine drive (command) lines from the diode program plugboard enter the test can 810 as represented by functional lines 819 to 827. Each of the drive lines, when activated, drives a different relay bank within the test can 810. All of the coils within the test can 810 have one end connected to −24 volts and the other end connected to the respective drive lines. The order in which these drive lines are activated is a function of the program plugboard and will control the order of the tests performed within the can. A special B signal drive line represented by functional line 817 is a required test drive line input. The nature of this special B drive line 817 and the purpose thereof will become clear after a description of the test can operation.

A 20 kilocycle stimulus pulse on line 816 is required for all tests performed within the test can 810. Thus the stimulus is provided to the can throughout the multiplexing of the AC tests performed within. The generation of the stimulus pulse on line 816 is also illustrated in FIG. 1. A 20 kilocycle oscillator 812 is connected to monostable multivibrator 813 which shapes the pulse so that it obtains the required duty cycle and the proper lower DC level. A pulse shaper 814 improves the pulse rise time (less than 2 ns.) and provides the proper upper DC level. This pulse is connected to the test can 810 through transmission line 815. The function of this stimulus pulse will become clear after a description of the test can operation.

The output of test can 810 appears on a single line 850 which is connected to tower 3 or 4 (shown in copending application Ser. No. 468,395, now U.S. Patent 3,400,933). The output line 850 is at a DC voltage proportional to the performance of the device under test. This DC voltage will change with the test multiplexing so that the output line 850 will provide analog information relating to the particular device parameter tested during any given drive line signal. The switching time meter 811 is positioned on top of test can 810. It receives the base and collector voltages of the device under test within the test can 810, and converts this into analog information. The output of the switching time meter 811 is connected to the test can 810 as shown by functional line 849. The meter output is connected to the test can output 850 while some of the tests are being performed, but undergoes further processing within the test can 810 during the performance of other tests. The switching time meter 811 is a conventional EH Research Model 143 of well-known construction and manufactured by EH Research Laboratories of Oakland, California. The operation of the test can 810 and the switching time meter 811 will be made clear after further description. In the discussion below, the polarities are stated with the assumption that the transistor under test is of NPN type.

The device under test may be tested for the following parameters: turn-on time delay, turn-off time delay, storage time, turn-on transition time delay, and turn-off transition time delay. The definitions of these terms as utilized hereinafter may be best understood by referring to FIGS. 2 to 4. The turn-on time delay (FIG. 2) is the time required for the voltage at the collector of the device to fall from the supply voltage to a predetermined specified level $V_2$ after the base drive has reached a predetermined specified level $V_1$. Thus if waveform 887 is the base drive turning on the device under test, and waveform 888 is the collector voltage of the device so driven, the turn-on delay is the time represented by the legend "$T_{on}$ DELAY" in FIG. 2.

The turn-off delay (FIG. 3) is the time required for the voltage at the collector of the device to rise to $V_5$ at a predetermined specified percentage of the collector supply voltage, after the base drive voltage has dropped to a predetermined specified level $V_4$. If waveform 889 is the base drive turning off the device under test, and waveform 890 is the collector voltage of the device so being turned off, the turn-off delay is the time represented by the legend "$T_{off}$ DELAY" in FIG. 3. The storage time (FIG. 4) of the transistor under test is the time required for the transistor to begin to rise to $V_8$ from its saturation voltage, after it has been cut off by a negative-going base voltage drive having a fall time to $V_7$ which is small compared to the switching capability of the transistor under test. If waveform 891 represents such a base drive, and waveform 892 represents the collector voltage of a transistor so driven, the storage time is the time represented by the legend "STORAGE TIME" shown in FIG. 4.

Typical waveforms which might be used to drive the transistor under test, as an illustrative series of AC tests, are as follows: a turn-off base drive falling from 1.5 volts to 300 millivolts with a fall time of 25 ns., a storage time base drive falling from 5.0 volts to −1.0 volt with a fall time of less than 5 ns., and a turn-on base time rising from 300 millivolts to 3.50 volts with a rise time of 10 ns. Controls are available within the test can such that the up and down levels, as well as the rise or fall times of each of these waveforms, are continuously adjustable by means within ramp generators which will be described below.

The turn-on transition time delay (FIG. 2) is the time required for the collector of a transistor 860 (FIG. 5) under test to fall from some predetermined specified voltage $V_2$ below the supply voltage to another predetermined specified voltage $V_3$ above the saturation voltage, after the base turn-on drive has been applied to the transistor 860. The turn-on transition time delay of the transistor having a collector waveform as shown by 888 is represented by the legend "$T_{on}$ TRANSITION" in FIG. 2. The turn-off transition time delay (FIG. 3) is the time required for the device to rise from some voltage $V_5$ above the saturation voltage to some other predetermined voltage $V_6$ below the collector supply voltage, after being driven by the turn-off base drive. The turn-off transition time delay of the device having a collector voltage 890 is shown by the legend "$T_{off}$ TRANSITION" in FIG. 3.

The operation of the test can 810 may be understood by referring to the diagram of FIG. 5. The stimulus pulse on line 816 is transmitted to relay bank 851. Thus the stimulus pulse will pass through the relay contacts (not shown) of bank 851 and drive one and only one of the three ramp generators 852, 853 or 854. The ramp generator to which the stimulus pulse is connected is dependent upon the test being performed which is controlled by the drive lines entering the relay bank 851 which are activated at that time. The contacts (not shown) of relay bank 855 are controlled by the same drive lines controlling those of relay bank 851. The contacts of relay bank 855 are arranged such that the output of the particular ramp generator receiving the stimulus pulse is connected to the rest of the subsystem within the test can, and the outputs of the other two ramp generators are open circuited. In this manner relay bank 851 and 855 connect only that ramp generator which is to be utilized for the specific test being performed and isolate the other two ramp generators.

Relay bank 856 connects the proper input impedance to the base 860b of transistor 860, the transistor under test. Thus for a turn-off test, the output of the turn-off ramp generator 852 will be connected through the input impedance 857 to the base 860b of the transistor 860. Similarly, ramp generator 853 will be connected to the base 860b of transistor 860 through impedance 858 during a storage time test, and ramp generator 854 will be connected to the base 860b of transistor 860 through impedance 859 during a turn-on test. Relay bank 861 connects the proper load and bias to the collector 860c of the test transistor 860. Thus during a turn-off test its contacts are such as to connect the load 862 to the transistor collector 860c, the load 863 to the collector 860c during a storage time test, and the load 864 to the collector 860c during a turn-on test. The contacts within relay banks 856 and 861, as well as the contacts of all relay banks hereinafter mentioned, are controlled by their respective drive lines as were the contacts of relay banks 851 and 855 previously described. The emitter 860e is grounded as shown.

In this manner, relay banks 851, 855, 856 and 861 multiplex specified circuit connections and drives to the device 860 for each test performed within the test can 810. This following discussion pertains to the manner in which the switching time meter 811 acting with the test can 810 transforms the out response of the device 860 under test into useful analog information.

Figure 7:
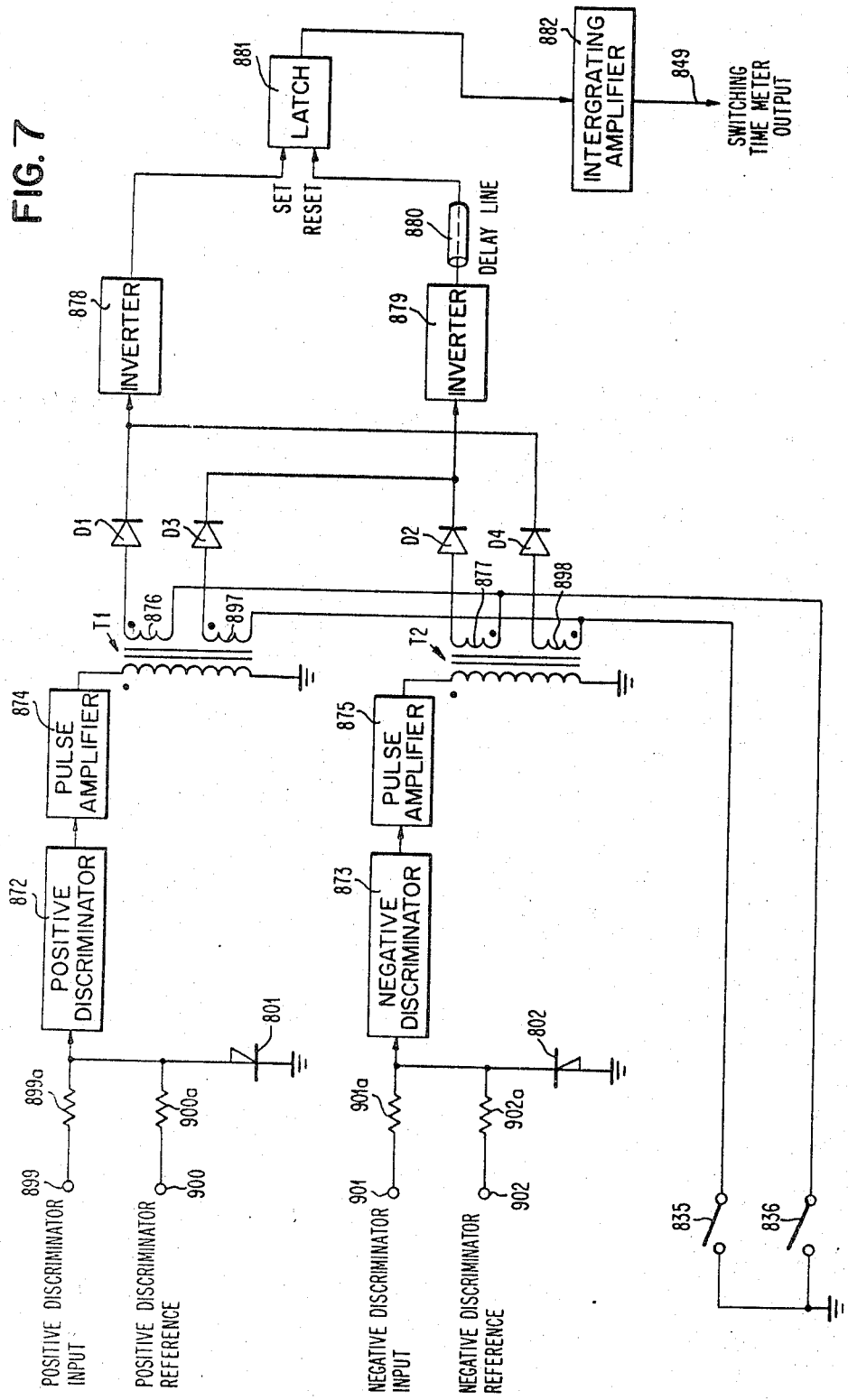
FIG. 7 is a schematic view illustrating the operation of the switching time meter.

The switching time meter 811 responds to a preset value of base voltage, a preset value of collector voltage, and supplies an output voltage proportional to the time between the occurrence of these two preset values. By referring to FIG. 7, the operation of the switching time meter 811 may be understood. The meter has two modes of operation which are controlled by relay bank 870. The contacts of relay bank 870 switch the mode of operation by grounding one of the switch inputs 835 or 836 of the switching time meter as shown in FIG. 7. For example, if switch 836 is closed and switch 835 is open, secondary windings 876 and 877 of transformers T1 and T2 respectively, will be connected to the circuit while windings 897 and 898 are isolated from the rest of the circuit.

Under these conditions, the switching time meter 811 will operate as follows. A positive-going signal from the AC test can is connected to the meter input 899 and drives the positive discriminator 872 through a 1K resistor 899a. When this positive-going input reaches the predetermined level, positive discriminator 872 will transmit a pulse which will be amplified by pulse amplifier 874. The amplified pulse will be coupled through transformer T1 and diode D1 to drive inverter 878 which is connected to the secondary winding 876. The output of inverter 878 will set the latch 881. When set, the output of the latch 881 will be a positive DC level which will remain at that level until the latch 881 is reset by a reset pulse transmitted through the 25 ns. delay line 880.

This reset pulse is derived from a negative-going input signal on line 901 which extends from the test can 810, in a manner similar to that in which the set pulse was derived from the positive-going input applied to line 899. That is, a pulse will be transmitted from the negative-going discriminator 873 in response to attainment of a predetermined level by the negative-going waveform at input line 901 across resistor 901a. This pulse is amplified by amplifier 875, and coupled to the input of inverter 879 through the transformer T2, in particular through the secondary winding 877 and diode D2. The pulse appearing at the output of inverter 879 undergoes a 25 ns. delay through the delay line 880 and is then connected to the reset input of latch 881.

In this mode of operation, the positive and negative-going inputs transmitted from test can 810 are the base and collector voltages respectively of transistor 860 as it is being turned on. Since the switching of transistor 860 occurs at the rate of 20 kc., determined by the rate of the 20 kc. stimulus pulse 816, latch 881 is set and reset at a frequency of 20 kc. as the stimulus pulse 816 rises. This setting and resetting of the latch 881 continues during the entire duration of the drive line signal controlling the particular test being performed at the time. Thus, during this operation, the output of the latch circuit is a 20 kc. waveform with a duty cycle or pulse width determined by the time between the occurrence of a preset value of the positive-going input level, and the occurrence of the preset value of the negative-going input level.

This output waveform, the output of the latch 881, is then fed into an integrating amplifier 882. The output signal of the integrating amplifier 882 on line 849, is a DC level proportional to the duty cycle (pulse width) of the waveform at its input. Therefore, the output signal on line 849 is proportional to the time between the occurrence of the two preset levels of the positive and negative-going waveforms entering the input of the switching time meter at 899 and 901, respectively.

The preset values at which the respective discriminators 872, 873 will fire is determined by two other input voltages 900 and 902, which are connected to tunnel diodes 801 and 802 respectively, through 1K resistors 900a and 902a respectively. These reference voltages determine the value of the discriminator input voltage at which the discriminator will react by adjusting the bias of the respective tunnel diodes.

The other mode of operation is achieved when switch 836 is open and switch 835 is closed. Under these conditions secondary windings 897 and 898 are connected through diodes D3, D4 to the rest of the switching meter circuit 811, while secondary windings 876 and 877 are now isolated. Under these conditions, T1 will be connected to the input of inverter 879 and T2 will be connected to the inverter of 878. Thus it is seen that the pulse occurring when the predetermined level of the positive-going input swing is reached now resets the latch 881 while that occurring after the preset level of the negative-going swing is reached now sets the latch 881.

Referring again to FIG. 5, it may be seen that the waveforms of the base drive and collector response of transistor 860 are brought to various operative functional blocks and then to the switching time meter 811. The collector response is brought through emitter-follower 865 to mode switch 866 while the base drive of transistor 860 is brought from between the two relay banks 855 and 856 directly to the mode switch 866. Mode switch 866 assures that the positive-going waveform will be connected to the input 899 to thereby drive the positive discriminator, and that the negative-going waveform is connected to input 901 to thereby drive the negative discriminator. For depending upon what test is being performed, the base waveform may either be positive-going or negative-going and the collector waveforms will always be of the opposite sense.

For example, relays within mode switch 866 will connect the output of emitter-follower 865 to input 899 such that it will drive the positive discriminator 872 during a turn-off test while the base drive will be connected to input 901 thereby driving the negative discriminator. During a turn-on test, the collector voltage is a negative-going signal and the base drive is a positive-going signal. Thus the relays within mode switch 866 direct the collector voltage to drive the negative discriminator 873 and the base voltage to drive the positive discriminator 872.

Relay banks 867, 868, 869 and the voltages passing through the contacts thereof, determine the tunnel diode bias voltage which appear at the reference inputs 900 and 902 and set the discriminator input levels at which the discriminators react. These relay contacts are connected to resistive voltage dividers such that reference voltages may be multiplexed in accord with different specifications for each of the tests performed. These resistive voltage dividers are partially composed of variable resistors such that multiplexed reference voltages may be preset through a continuous variable range pursuant to the device specification. Relay bank 870 connects the proper secondary windings of transformers T1 and T2 within the switching time meter 811 as previously described. It is essential that relay bank 870 and mode switch 866 work in conjunction with each other such that the base drive sets the latch 881 whether it is a positive-going or negative-going waveform, and the collector signal resets the latch 881 whether it is a positive-going or negative-going waveform. For example, during a turn-off test, mode switch 866 will connect the base drive voltage such that it drives the negative discriminator 873 and relay bank 870 will connect the pulse from the negative discriminator 873 to the reset of the latching circuit 881.

Figure 2:
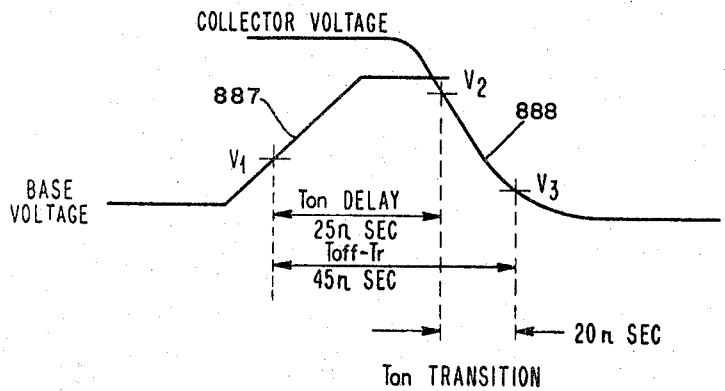
Figure 3:
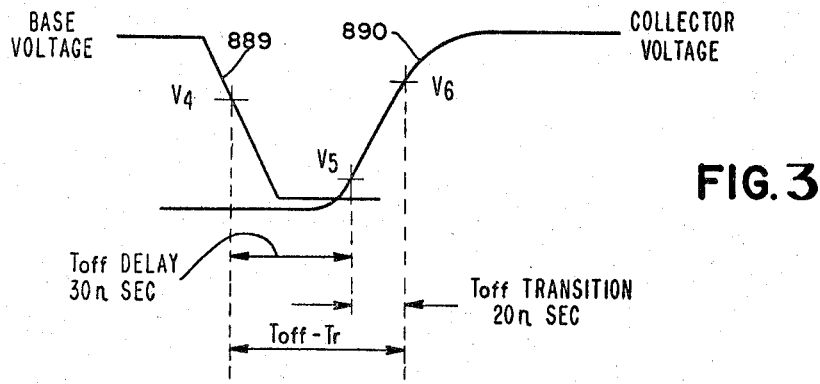
FIG. 3 shows the base and collector voltage waveforms for a transition measurement during turn-off.
Figure 4:
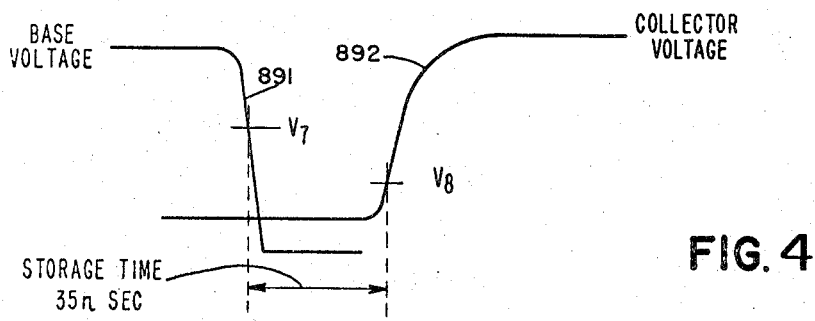
FIG. 4 shows the base and collector voltage waveforms for a storage time measurement.

In this manner analog information relating to the turn-on and/or the turn-off time delay of the device under test is obtained from the test can 810 and switching time meter combination. Waveforms 887 to 892 of FIGS. 2 to 4 illustrate a response of a typical transistor under test. The output 849 of the switching time meter 811 will be a voltage proportional to the 25 ns. turn-on time delay shown for waveforms 887 and 888. The specific voltage values indicated by $V_1$ through $V_8$ are the input values at which the discriminators 872 and 873 will fire. These values are preset and multiplexed by switching the bias of tunnel diodes 1 and 2 as previously described. For the turn-on test, base voltage 887 will set the latch 881 by firing the positive discriminator 872 after base voltage 887 reaches the value indicated by $V_1$. The latch 881 will be reset 50 ns. later (25 ns. of turn-on time delay plus 25 ns. of fixed latch reset delay through the delay line 880) through the negative discriminator, by collector voltage 888, when collector voltage 888 reaches the preset value indicated by $V_2$. Similarly, analog information relating to the turn-off delay of the typical device under test may be obtained as a voltage proportional to the 30 ns. turn-off time delay shown between waveforms 889 and 890. For this test, relay bank 870 and mode switch 866 are such that the base voltage 889 sets the latch 881 through the negative discriminator 873 and the collector voltage 890 resets the latch 881 through the positive discriminator 872.

The storage time of the device under test is measured similarly to that of the turn-off time. The difference between these two tests resides in the circuit conditions connected to the transistor 860. The conversion of the transistor reaction, under such circuit conditions to useful analog information, is by the same operation utilized with the turn-off test. The output of the storage time ramp generator 853 has a larger amplitude and faster fall time than that of the turn-off ramp generator 852. Thus the difference in time between the set and reset of the latch 881 will be the time required to pull transistor 860 out of saturation.

An output signal proportional to the transition time of the transistor may be obtained with the same switching time meter 811 utilized for the other operations. This is accomplished by multiplexing the switching time meter through the utilization of the circuit contained in block 871 of FIG. 5. Referring to waveform 888, we can see that the turn-on transition time delay may be determined by performing two successive turn-on tests. If the required turn-on time delay is determined (e.g. 25 ns. for a typical device under test) and then the turn-on time is determined (45 ns. for a typical device), the two times may be subtracted and the difference will be turn-on transition time required. In a similar manner, the turn-off transition time may be found by taking two successive turn-off times as illustrated for the base and collector waveforms 889 and 890.

Thus for a transition time measurement, the switching time meter 811 determines two successive time intervals, and provides two successive voltages proportional thereto. Each of these measurements are made in response to two independent drive line signals. During the first of these drive line signals, the output line 850 of blocks 871 will be connected directly through its input line. Thus output 850 of test can 810 contains the analog information relative to the turn-on time delay of the device. During the second drive line signal, a turn-on time measurement is made, and the output voltage of the switching time meter 811 will change to a value proportional to this second time measurement. Circuit 871 then operates on the two successive voltages such that its output voltage on line 850 is the difference between the value of the first and second input voltages. This difference is directly proportional to the difference between the two time intervals, and will therefore be a measurement of the transition time of the device under test.

Figure 8:
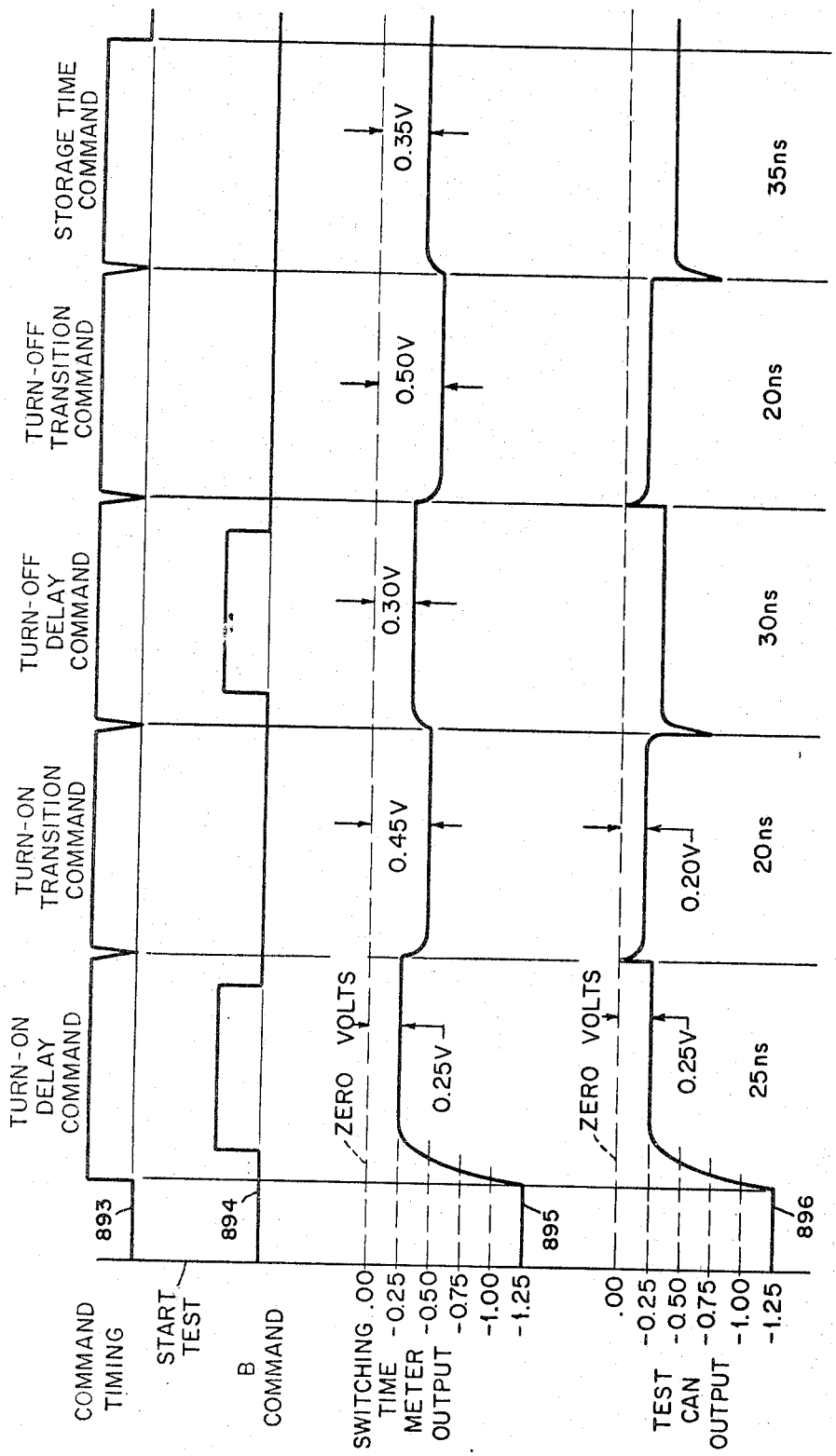
FIG. 8 shows the timing, command meter output, and test can output waveforms during a sequence of multiplexed transient response measurements.

The circuit within block 871 is shown schematically in FIG. 6. This circuit provides a means for measuring differences between two successive voltages which appear in response to successive timing pulses. The pertinent waveforms are shown in FIG. 8. Command signal 893 connects the output 849 of the switching time meter 811 to the input of the circuit block 871 as the first turn-on time delay measurement is made. At this time, the input line of the circuit 871 is connected directly through to its output line due to the unactivated state of relay 886. The waveforms of the input and the output of the circuit are thus identical as shown by 895 and 896 respectively. While the switching time meter 811 is so connected to the circuit 871, the special drive line pulse B activates relay 885 so that the positive side of capacitor 884 is connected to ground. Thus capacitor 884 will charge to a voltage equal in magnitude to the input of the circuit 871, which is of course, the output of the switching time meter 811. Before the end of this first turn-on delay, drive line signal B ends such that relay 885 returns to its unactivated position. This will place capacitor 884 in an incomplete circuit so that it will remain charged at the original input voltage.

The second drive line signal connects the second output of the switching time meter 811 to the input of the circuit 871 and activates relay 886. With relay 886 activated, the voltage appearing at the output of circuit 871 is equal to the sum of the voltage presently at the input of the circuit 871 and the voltage across the capacitor 884. Since the voltage across the capacitor 884 is equal to the first output of the switching time meter and of a polarity to oppose the present input of the circuit 871, and the voltage at the input is equal to the second ouput of the switching time meter, the voltage appearing at the output of the circuit 871 is the difference between the first and the second outputs of the switching time meter 811. As previously described, this difference in voltage will be proportional to the transition time of the transistor 860 under test. The output voltage during this transition measurement is shown by waveform 896.

The turn-off transition time test is performed in a like manner. The two successive outputs of the switching time meter 811 will be voltages proportional to the two turn-off times shown for waveforms 889 and 890. Circuit 871 will operate in the same manner as it did when the two voltages representing the turn-on delay times were previously connected to its input. Thus, during the turn-off drive line signal, the output of circuit 871 is connected to its input, and the output appearing on line 850 is analog information relating to the turn-off time delay of the transistor 860.

As is seen from the waveforms 895 and 896 during this signal, the amplitudes of the switching meter output 849 and the test can output 850 are equal. Again, the special B command will occur during the turn-off delay signal. During the turn-off transition drive line, the output of the meter is proportional to the second turn-off time measurement and is shown by the 500 millivolt amplitude of waveform 895 during that command. Again during this command, the output if circuit 871 is equal to the difference in voltages between the first and second outputs of the switching time meter 811. This is represented during the turn-off transition drive line signal, by the amplitude of the waveform 896 which is 200 millivolts at this time.

The switching time meter is scaled such that the relationship between the output voltage and the time being measured is 10 millivolts per nanosecond. Thus as shown by waveform 896, the 250 millivolt output during a turn-on signal represents a 25 ns. turn-on time delay, the 200 millivolt output during the turn-on transition signal represents 20 ns., the 300 millivolt output during the turn-off delay command represents a 30 ns. turn-off time delay, the 200 millivolts shown during the turn-off transition command represent 20 ns., and the 350 millivolts during the storage time drive line signal represents the storage time of 35 ns. It is to be understood that these values are merely illustrative of a typical device performance.

The particular order of cycling shown in FIG. 8 (turn-on delay, turn-on transition, turn-off delay, turn-off transition and storage time) is illustrative of one of the orders that may be programmed by the program plugboard of each tower 3 or 4 of the system. It is not necessary that all the tests shown be performed, nor that they all be performed in the order shown. However, a turn-on transition time delay test must follow a turn-on delay test, and a turn-off transition time delay test must follow a turn-off time delay test. This is necessary because the transition time information is obtained from the subtraction of two successive turn-on measurements. The first of these measurements provides the actual turn-on delay time required, while the second is utilized to provide the transition time.

The coined term "turn time" as used in the claims is hereby defined to be generic to include both "turn-on" time and "turn-off" time. Similarly, the coined term "turn delay time" hereby defined generically to include both "turn-on delay" time and "turn-off delay" time.

What is claimed is:

1. Apparatus for determining the transition time response of a circuit element having an input and an output, said apparatus comprising: a pulse generator; a plurality of ramp generator means and means to connect said pulse generator to a selected one of said ramp generators; a plurality of input impedance circuits and means to connect said selected one of said ramp generators to at least one of said impedance circuits; a plurality of load circuits and means to select one of said load circuits for connection to the output of the element under test and to connect the said at least one impedance circuit to the input of the element under test; means responsive to the input and output signals of said element under test for generating a first and second voltage, said first voltage being proportional to the turn time between said input and output of said element; storage means for storing said first voltage, and said second voltage being proportional to the turn delay time impressed upon said storage means whereby the difference between said voltages determines the transition time.

2. Apparatus in accordance with claim 1 wherein said storage means comprises: a capacitor having first and second terminals connected thereto; switch means connected to said second terminal and operable between at least one of two positions, said first position being at ground readout potential, said second position being an output; said switch means operatively connected to said first position when one of said voltages is impressed upon said first terminal, and operatively connected to said second position when the other of said voltages is impressed upon said first terminal to thereby transmit a voltage output proportional to the transition time of said circuit element.

3. Apparatus in accordance with claim 1 wherein said element to be tested includes a transistor.

4. Apparatus in accordance with claim 3 wherein said means responsive to input and output of said transistor includes a latch means and integrating means, and wherein second voltage proportional to the turn delay time is impressed upon said storage means by said latch and integrating means.

References Cited

UNITED STATES PATENTS 3,254,301  5/1966  McGrath _____ 324—158
3,286,180  11/1966  Hubbs _____ 324—158

RUDOLPH V. ROLINEC, *Primary Examiner.*

E. L. STOLARUN, *Assistant Examiner.*

U.S. Cl. X.R.

324—57, 68, 111